US007675858B2

(12) United States Patent
Dekeyzer et al.

(10) Patent No.: US 7,675,858 B2
(45) Date of Patent: Mar. 9, 2010

(54) COMMUNICATION SYSTEM, APPARATUS AND METHOD FOR PROVIDING MOBILITY MANAGEMENT INFORMATION

(75) Inventors: Dimitri Dekeyzer, Bruyeres et Montberault (FR); Jogesh Patel, West Hendon (GB)

(73) Assignee: France Telecom, Paris (FR)

( * ) Notice: Subject to any disclaimer, the term of this patent is extended or adjusted under 35 U.S.C. 154(b) by 670 days.

(21) Appl. No.: 10/585,234

(22) PCT Filed: Dec. 21, 2004

(86) PCT No.: PCT/EP2004/014761

§ 371 (c)(1),
(2), (4) Date: Jun. 29, 2006

(87) PCT Pub. No.: WO2005/064883

PCT Pub. Date: Jul. 14, 2005

(65) Prior Publication Data

US 2007/0159976 A1 Jul. 12, 2007

(30) Foreign Application Priority Data

Dec. 31, 2003 (EP) .................................. 03293351

(51) Int. Cl.
*H04L 12/16* (2006.01)
(52) U.S. Cl. ...................................................... 370/236
(58) Field of Classification Search ................ 370/238; 705/1; 719/310
See application file for complete search history.

(56) References Cited

U.S. PATENT DOCUMENTS

2005/0065801 A1* 3/2005 Poikselka et al. ............... 705/1
2005/0155036 A1* 7/2005 Tiainen et al. ............... 719/310

FOREIGN PATENT DOCUMENTS

WO WO 01/58177 A2 8/2001

(Continued)

OTHER PUBLICATIONS

"Motivation for Network Controlled Handoffs using IP mobility between heterogeneous Wireless Access Networks", by E. Njedjou et al., IETF Mobile IP Working Group, Jun. 2003 (http://www.watersprings.org/pub/id/draft-njedjou-inter-an-handoffs-00.txt).*

(Continued)

*Primary Examiner*—Albert T Chou
(74) *Attorney, Agent, or Firm*—Cohen Pontani Lieberman & Pavane LLP

(57) ABSTRACT

A communications system is arranged to provide a service to user equipment in accordance with mobility management information. The system comprises a session protocol server (S-CSCF) operable to control the state of a communications session for at least one user equipment in accordance with user profile data, a subscriber information database (HSS) for providing the user profile data for the session protocol server (S-CSCF), and a mobility server. The mobility server comprises a mobility manager operable to receive mobile dependent evaluation reports providing an indication of a current state for communicating with the user equipment and to form the mobility management information based on the evaluation reports. The mobility server includes an application programmer's interface operable to communicate call control signalling data between the mobility manager and the session protocol server (S-CSCF). The mobility manager is operable to notify the application program providing the service to the user equipment of the mobility management information in response to a subscription for the information from the application program, the subscription being provided via the session protocol server (S-CSCF) using the call control signalling data. By integrating the mobility server within the system, mobility management information provided by the mobility server can be integrated with other services provided by the system. As such, mobile users deploying application programs within the system, which subscribe to the mobility server, can benefit from added value provided by established system components and re-using established interfaces.

20 Claims, 10 Drawing Sheets

FOREIGN PATENT DOCUMENTS

| WO | WO 02/19729 A | 3/2002 |
|----|---------------|--------|
| WO | WO 03/061236 A | 7/2003 |
| WO | WO 03/087972 A | 10/2003 |

OTHER PUBLICATIONS

Busropan et al., "Architectural Specification of Interworking of Heterogeneous Technologies and Multimedia Session Control", Apr. 16, 2003.

"Universal Mobile Telecommunications System (UMTS); IP Multimedia Subsystem (IMS); Stage 2 (3GPP TS 23.228 version 5.4.1 Release 5)", pp. 1-149, Apr. 2002.

"Universal Mobile Telecommunications System (UTMS); Virtual Home Environment (VHE) / Open Service Access (OSA); Stage 2 (3GPP TS 23.127 version 5.2.0 Release 5); ETSI TS 123 127", European Telecommunications Standards Institute, Sophia-Antipo, France, Jun. 2002.

Njedjou et al., Motivation for Network Controlled Handoffs using IP mobility between heterogeneous Wireless Access Networks, IETF Internet Draft, Jun. 1, 2003.

Haase et al., "Unified Mobility Manager: Enabling Efficient SIP/UMTS Mobile Network Control", IEEE Service Center, Piscataway, NJ, vol. 10, No. 4, pp. 66-75, Aug. 2003.

\* cited by examiner

COMMUNICATION SYSTEM, APPARATUS AND METHOD FOR PROVIDING MOBILITY MANAGEMENT INFORMATION

RELATED APPLICATIONS

This is a U.S. National Phase Application under 35 USC 371 of International Application PCT/EP2004/014761, filed on 21 Dec. 2004.

FIELD OF THE INVENTION

The present invention relates to mobility servers for providing mobility management information in a communications systems.

The present invention also relates to a communications system for providing multi-media communications services.

In some embodiments the communications system includes a Internet Protocol Multi-media Sub-system (IMS).

BACKGROUND OF THE INVENTION

The third generation partnership project known as 3GPP has developed and standardised an Internet Protocol Multi-media Sub-system (IMS) to provide a multi-media and call control service architecture. The service architecture is supported by a real-time capable Universal Mobile Telecommunications System (UMTS) communicating data in the form of Internet Protocol (IP) packets. IMS provides a basis for service provision and development of new services and is envisioned as a standardised convergence platform, which enables integration of real time multi-media services with non-real time services and person-to-machine communications. In addition, IMS provides the ability to modify a media type, which is active during a multimedia session. For instance, video media can be added during a communications session which was originally established for an audio only communication.

Co-pending European Patent application number 02293276.8 discloses a mobility manager, which can initiate and direct hand-over execution of a mobile terminal from one access network to another, in accordance with information received from a network operator, the network itself and mobile terminals and a network policy provided by a policy enforcer. The mobility manager provides a facility for enabling a network operator to adapt a service being provided by an application program in accordance with a relative ability of an access network to which the mobile terminal is to be re-affiliated to support the service, before or after the re-affiliation has occurred. To this end, there is also disclosed a communication protocol between an application server and a mobility manager located in a core network of a mobile communications network.

WO 01/58177 discloses a method for controlling hand-over of a mobile terminal conducting a communications session in a mobile communications network. The method includes receiving a trigger indicating a requirement for hand-over, testing the conditions for hand-over with respect to a network policy for communicating and controlling the hand-over in accordance with the hand-over requirement with respect to the network communications policy.

SUMMARY OF INVENTION

According to the present invention there is provided a mobility server for providing mobility management information to an application program. The application program provides a service to a user equipment as part of an Internet Protocol Multi-media Sub-system (IMS). The mobility server comprises a mobility manager operable to receive mobility dependent evaluation reports providing at least one of an indication of a current state of conditions for communicating with the user equipment and an indication of a location of the user equipment, and to form the mobility management information based on the evaluation reports. The mobility server includes an application programmer's interface operable to communicate call control signalling data between the mobility manager and a session protocol server (S-CSCF) forming part of the IMS. The mobility manager is operable to notify the application program of the mobility management information in response to a subscription for the mobility management information from the application program, the subscription for the mobility management information being provided via the session protocol server (S-CSCF) using the call control signalling data.

The mobility management information may be provided for a particular user or a set of users, which have applied for mobility services.

Embodiments of the present invention can provide a mobility server for a communications system which may form part of an Internet Protocol Multi-media Sub-system (IMS) for providing a facility for establishing, controlling and terminating a multi-media communications session with a user equipment. The mobility server can provide the communications system with a capability for enabling mobile enhanced services to be provided to the user equipment in support of communications facilities provided by the system. The mobility server is arranged to generate mobility management information as part of the system. As a result, the IMS is enabled to provide mobile dependent services to the user equipment. An example of such services for multi-media applications includes an adaptation of a media type being supported during a session depending upon a current state of communications with the mobile user equipment.

In the following description the phrase mobility dependent evaluation reports is used to include such things as Access Network Evaluation reports indicating a current state of communications conditions experienced by a mobile user equipment and reports indicating a relative location of the mobile user equipment.

In some embodiments the mobility server may include a home agent, so that following a change of access network, a binding update may be performed by the mobile user equipment resulting in a change of IP address. The change of IP address reported by the home agent to the mobility manager can be used to provide an indication of a relative location of the user equipment from which a geographically dependent service can be provided.

An application program can be arranged to provide services to a user equipment in dependence upon the mobility management information. For example, the application program may provide a communications session between two users. The application program may be arranged to provide a different type of communication media to the users depending upon a current state of communications for the user equipment. For example, if the user equipment is attached to a Wireless-Local Area Network (W-LAN), then a relatively high bandwidth may be available, which may be sufficient to support a video communication session. However, if one of the user equipment should experience a reduction in an available quality-of-service, then this reduction can be detected by the mobility manager through receipt of Access Network Evaluation reports which provide an indication of a current state of conditions for communicating, which according to this example include an available quality-of-service. The application program providing the communication session, having subscribed to the mobility server for mobility management information should receive a notification of the change of communications conditions as part of the mobility management information reported. Accordingly, the application program can adapt the type of media service offered to the user in accordance with the change in the communications conditions.

According to some embodiments of the invention, the subscription to the mobility server and the notification of the mobility management information is provided through the session protocol server (S-CSCF). An advantage of communicating the notification and the subscription via the session protocol server is that facilities provided by the session protocol server can be utilised to add value to the service provided to the users by the application program which utilises the mobility management information. One example of such a facility would be where an ancillary function or service is provided when a notification of mobility management information or indeed the subscription to the mobility server is made. This might be used for example to effect more accurate billing of services provided either by the application or by the mobility manager.

In some embodiments, the application program may be operable in response to messages received from the session protocol server via the call control signalling data to provide the service in accordance with the mobility management information. According to such embodiments the mobility information is received via the session protocol server, which therefore provides a facility for deploying other services to add value to the communications session. However, in other embodiments the mobility server may communicate the mobility management information to the application program via a proprietary interface such as XML or HTTP.

In some embodiments the signalling of the notification and the subscription is effected using the Session Initiation Protocol (SIP), the session protocol server being a SIP server. According to these embodiments the application programmer's interface of the mobility server is operable to communicate the call control signalling data via the SIP interface, the call control signalling data being SIP data.

According to some embodiments of the invention, the mobility server can access a subscriber information database forming part of the IMS network (the subscriber information database within an IMS network is referred to as a Home Subscriber Server (HSS)). As such the mobility manager can utilise mobility related information stored within the database to improve the accuracy and value of the mobility management information generated. For example, the user profile data may include an indication of a capability of the user equipment available for communicating, from which more relevant mobility management information can be generated and provided to an application program. For example, if a user equipment is not capable of displaying video information then the mobility manager will not instruct a change of service to the user equipment if a quality of service offered by the current state of communications conditions can support video communications. In another example, the user profile data might include an indication of activation so that the mobility manager may monitor mobility even if not yet required.

According to an aspect of the present invention there is provided a communications system for providing a service to user equipment in accordance with mobility management information. The system comprises a session protocol server (S-CSCF) operable to control the state of a communications session for at least one user equipment in accordance with user profile data, a subscriber information database (HSS) for providing the user profile data to the session protocol server (S-CSCF), and a mobility server. The mobility server comprises a mobility manager operable to receive mobility dependent evaluation reports providing at least one of an indication of a current state of conditions for communicating with the user equipment and an indication of a relative location of the user equipment, and to form the mobility management information based on the evaluation reports. The mobility server also includes an application programmer's interface operable to communicate call control signalling data between the mobility manager and the session protocol server (S-CSCF). The mobility manager is operable to notify the application program providing the service to the user equipment of the mobility management information in response to a subscription for the information from the application program, the subscription being provided via the session protocol server (S-CSCF) using the call control signalling data.

In some embodiments the applications programmer's interface is operable to provide access to the subscriber information database, and to receive internet packets from the user equipment providing data representing the evaluation reports and to provide the evaluation reports to the mobility manager. The communications system can therefore form an Internet Protocol Multi-media Subsystem, which integrates mobility management as part of the system, re-using standardised components.

Various further aspects and features of the present invention are defined in the appended claims.

BRIEF DESCRIPTION OF THE DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

Example embodiments of the present invention can provide an Internet Protocol (IP) mobility management service within an IP Multimedia Subsystem (IMS) network. A mobility manager within the subsystem provides mobility management functions such as maintaining a continuity of service whilst a user equipment roams across a heterogeneous access network (for example between different wireless access networks). The mobility management service is thereby provided without requiring a propriety solution by re-using established interfaces and protocols, which have been standardised for the IMS. A network operator may offer enhanced quality IMS services to mobile subscribers with substantially seamless mobility.

Figure 1:
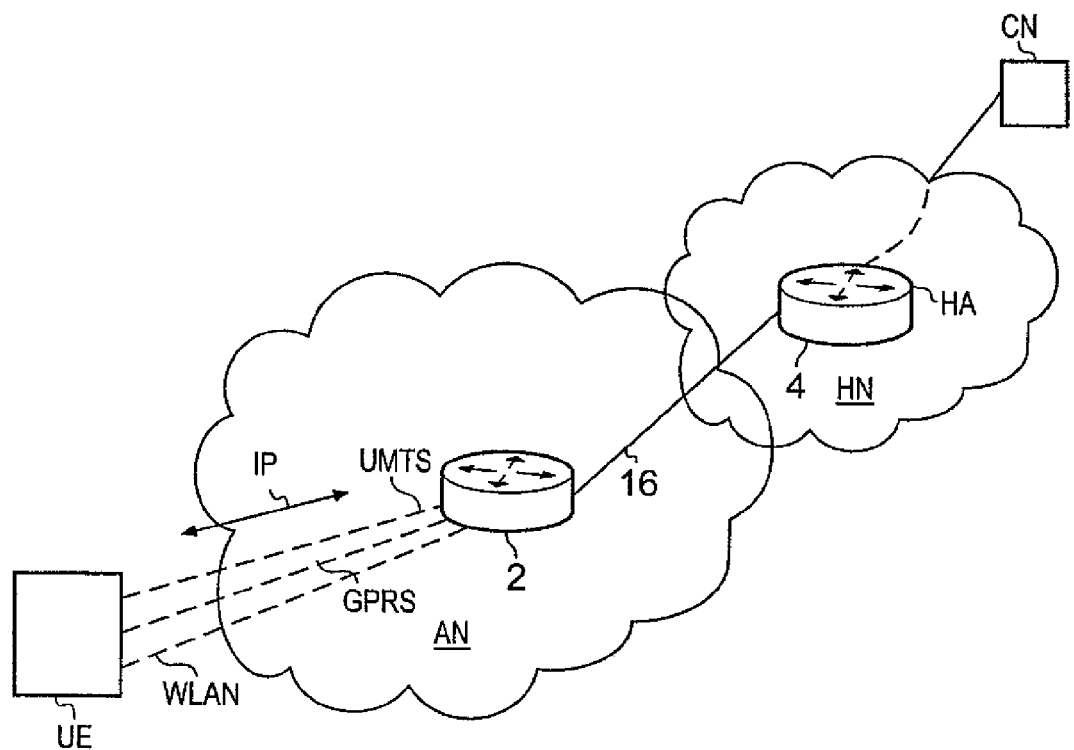
FIG. 1 is a schematic block diagram providing a simplified representation of a general Internet Protocol (IP) communication between a mobile user equipment and a correspondent node.

Generally, communication between a user equipment UE and a correspondent node CN is illustrated in FIG. 1. In FIG. 1 communication via IP packets is effected between the user equipment UE and the correspondent node CN via a mobile access network AN and a home network HN of the user equipment UE. Packets are routed between the user equipment UE and the routers 2, 4 one of which 4 within the home network HN may be a home agent HA.

The user equipment UE may be operated by a mobile subscriber and as a result will communicate IP packets with a router 2 via the mobile access network. The wireless access network may include a plurality of wireless access interfaces through which the user equipment may communicate IP packets. Examples of wireless access interfaces include a Universal Mobile Telecommunications System (UMTS), a General Packet Radio System (GPRS), or a Wireless Local Area Network (WLAN). Depending on the geographical location of the user equipment UE, one or more of the wireless access interfaces WLAN, GPRS, UMTS may be available to the user equipment UE. Accordingly, the user equipment UE may select a most appropriate wireless access interface for supporting a desired service to a user such as that providing a sufficient communications bandwidth for supporting a desired service. Alternatively, a wireless access network may be selected for providing a most cost-effective communication of IP data packets.

As will be appreciated a wireless access interface utilised by the user equipment UE may change from one area to another and with time. Accordingly, there is provided an arrangement for informing an application program of a current state of conditions for communicating with the mobile user equipment and/or a geographical location of the mobile user equipment. As a result the application program may adapt a service provided to the user equipment in accordance with a change in the communications conditions or the geographical location, as a result for example, of the mobile changing affiliation from one access network to another.

IPMM AND IMS

As disclosed in co-pending European patent application serial number 02293276.8 an IP Mobility Manager (IPMM) is arranged to provide mobile terminals with instructions to change affiliation from one access network to another in accordance with a state of communications conditions. The state of communications conditions may change as a result of a hand-over to a target wireless access network. The IPMM is arranged to provide mobility management information to an application program providing a service to mobile terminals. The mobility management information provides the application program with an indication of a state of communications conditions, resulting from or which will result from a change of affiliation. In response to the change, the application program may instruct the mobile terminals to adapt the service provided before or after the change of affiliation from a current access network to the target access network occurs. To this end, there is disclosed a communication protocol between an application server and the IP Mobility Manager located in a core network part of a mobile access network. The communications protocol is arranged to monitor a current state of communications on available access networks and to respond to a hand-over request for a change of affiliation from a current access network to a target access network by providing instructions to adapt a service provided to the mobile user equipment in accordance with the communications conditions of the target network. Generally, an example of such a communications network as would be applied to an IP Multimedia Subsystem (IMS) is illustrated in FIG. 2.

Figure 2:
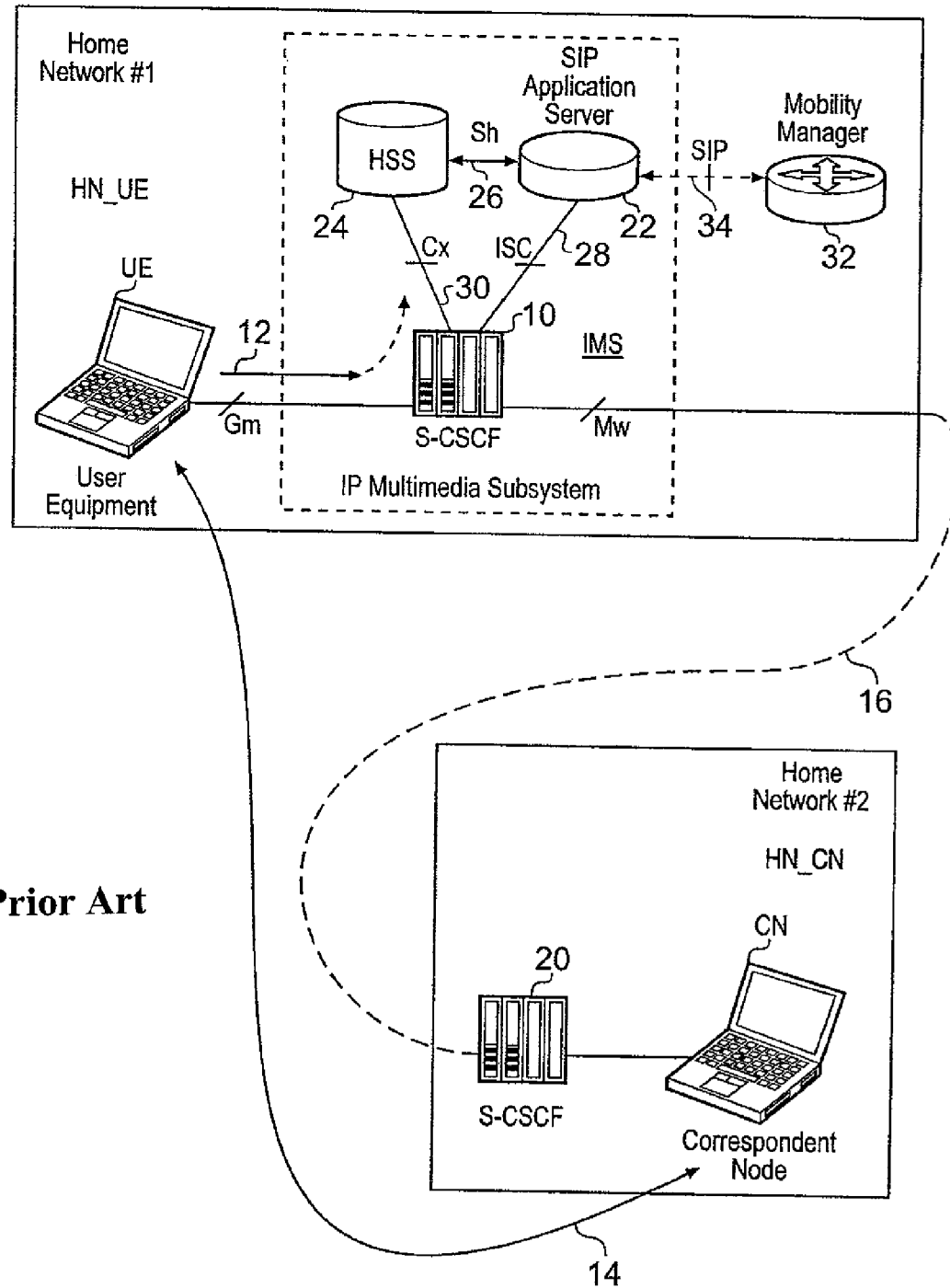
FIG. 2 is a schematic block diagram of a simplified representation of components forming part of a system comprising a stand-alone IP Mobility Manager and an Internet Protocol Multimedia Subsystem (IMS)

As shown in FIG. 2 the user equipment UE is communicating with the correspondent node CN using Internet Protocol (IP) packets from a first home network of the UE HN_UE to a second home network of the correspondent node HN_CN. As illustrated in the simplified block diagram, IP packets providing signalling information are communicated to a session protocol server 10 which for the example embodiment is a Serving Call State Control Function (S-CSCF) within an IMS network. IP packets are use to convey signalling data as represented by an arrow 12. As will be explained the IP packets are carrying Session Initiation Protocol (SIP) signalling messages to the IMS and onwards to the correspondent node CN. User data communicated between the user equipment UE and the correspondent node CN is represented by the double-headed arrow 14. It will therefore be appreciated that the diagram in FIG. 2 provides a representation of the communication of IP packets between the correspondent node CN and the user equipment UE as represented in FIG. 1. A dashed line 16 between the first home network HN_UE and a second home network HN_CN is representative of the communication of signalling IP packets, via routers within the core network.

At the correspondent node CN a Serving Call State Control Function (S-CSCF) 20 is also provided in order to respond to SIP messages communicated from the user equipment UE in order to trigger various services and/or provide other functions. These functions may be associated with controlling the state of the communication session.

As illustrated in FIG. 2, the IMS comprises the S-CSCF 10, a SIP application server 22 and a subscriber information database 24 which for the example embodiment is a Home Subscriber Server (HSS), which are all standardised components [1], together with the interfaces 26, 28, 30. The interfaces operate in accordance with the specified standard [1] and are referred to as Sh, ISC and Cx.

The IMS provides a facility for managing multimedia communication sessions such as that between the user equipment UE and the correspondent node CN. The communications sessions may be managed by an application program hosted on a SIP application server 22 which is arranged to respond to SIP messages and to control and manage the multimedia communication session.

Also shown in FIG. 2, within the first home network HN_UE, is a mobility manager 32. The mobility manager 32 operates as disclosed in co-pending European patent application number 02293276.8 to inform application programs providing services to users that a change in service type may be required due to a change in conditions for communicating data. The conditions for communicating may change as a result of a mobile user equipment UE changing from one wireless interface to another, or as a result of operating conditions changing on one of the wireless access interfaces being used. The IPMM instructs applications being executed by the user equipment UE and/or the correspondent node CN as part of the communication session to adapt the type of service provided during the session to reflect the change in the communications conditions. As illustrated in FIG. 2 communication between the mobility manager 32 and the application server 22 is via an interface 34 through which SIP messages are exchanged. However, as will be explained in the following paragraphs with reference to FIG. 3, the arrangement illustrated in FIGS. 2 and 3 have certain disadvantages. Following an explanation of these disadvantages it will be appreciated that embodiments of the present invention can provide facilities and advantages not available to the arrangement illustrated in FIGS. 2 and 3.

Figure 3:
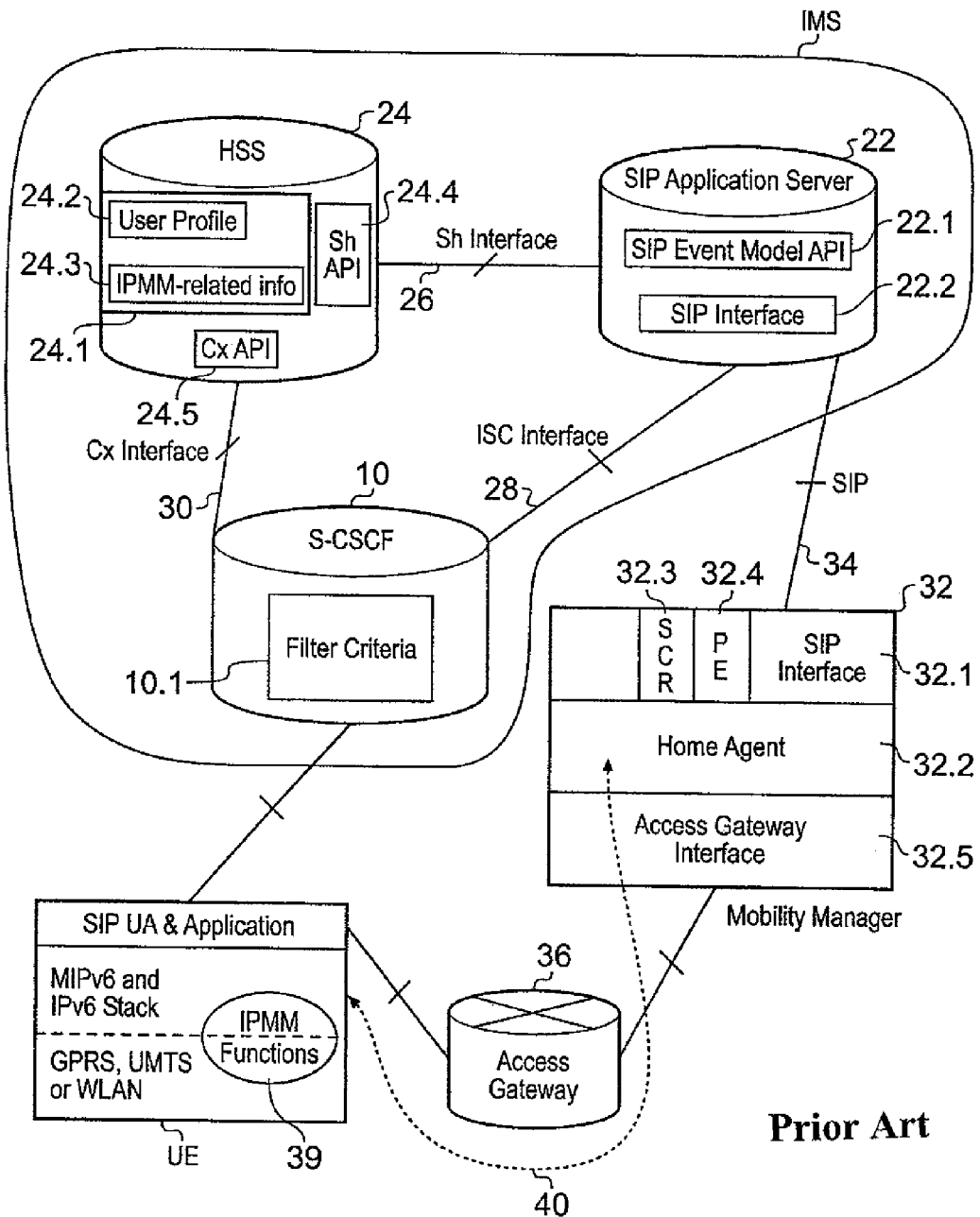
FIG. 3 provides a more detailed block diagram of parts of the system shown in FIG. 2.

FIG. 3 provides a representation of parts of the IMS shown in FIG. 2 with parts of the IP mobility management system also shown in FIG. 2 in more detail to illustrate how an IP mobility manager might operate with the IMS. As shown in FIG. 3 the mobility manager 32 is arranged to communicate SIP messages via the interface 34 with interface processor 32.1. The mobility manager 32 also includes a Subscriber Context Register (SCR) and a Policy Enforcer (PE) 32.3 and 32.4. The mobility manager 32 also includes a home agent 32.2 and an access gateway interface 32.5. The home agent 32.2 and the access gateway interface 32.5 provide a facility for communicating via an access gateway 36 to the user equipment UE which is executing a SIP User Agent. The user equipment UE is also executing an IP Mobility Management function 39, which generates Access Network Evaluation (ANE) reports. The ANE reports provide an indication for a state of communications conditions via any of a number of wireless access networks, which may be available to the user equipment. Therefore, as illustrated by a double-headed arrow 40 the user equipment UE communicates ANE reports to the mobility manager 32 in order to allow the mobility manager 32 to determine whether or not a change in service is required for a multimedia application. As shown in FIG. 3 the S-CSCF 10 also includes initial filter criteria 10.1 for triggering application programs to provide various services. The SIP application server 22 includes a SIP event model application programmer's interface 22.1.

In accordance with the IMS standard the Home Subscriber Server (HSS) 24 includes a database 24.1, a part 24.2 of which is used for storing user profile data and a part 24.3 of which is used for storing mobility-related information for users. The HSS also includes an Sb application programmer's interface 24.4, and a Cx application programmer's interface 24.5, for providing a facility for communicating via the Sh interface and the Cx interface respectively.

The HSS database includes the part 24.2 in which data, non-transparent to the HSS, is stored. The part 24.2 for storing non-transparent data, includes user profile data providing, for example, initial filter criteria for use by the S-CSCF. The HSS database also includes the part 24.3 for storing data, which is transparent to the HSS. This transparent data includes mobility-related information for use by the mobility manager or other application programs. The mobility-related information may include an indication of what is available to support a multimedia service in terms of capacity, hardware facilities and other utilities on the user equipment UE.

DISADVANTAGES OF USING A STAND-ALONE IPMM WITH IMS

IMS has been designed to be network independent and to provide inter-operability with different access networks. That means an IMS subscriber should be able to access IMS-based services independently from the access network via through which IP packets are communicated to the IMS. However IMS currently does not allow the continuity of a service when roaming across heterogeneous access network technologies (WLAN, GPRS, UMTS) which do not provide the same level of resources. The drawback of IMS is that it currently does not provide an Inter-access network mobility solution—'The ability of a terminal to move between access networks while still maintaining the capability to communicate and receive communications'.

IP Mobility Management provides the ability for a network operator to offer terminals under its control, a service that allows them to adapt applications to the capacity of access networks before a change from one access network to another, by roaming across heterogeneous access technologies. IPMM provides Seamless Mobility—'The ability of a terminal to move between access networks while still maintaining an active communications session in which the end users or applications are not disrupted by the change'. The drawback of just a simple IPMM service is that it currently provides a proprietary framework and does not integrate services.

It would be reasonable to use the IP Mobility Management functions within the IP Multimedia Subsystem (IMS) as illustrated in FIGS. 2 and 3. As illustrated this involves deploying a standalone IP Mobility Manager component within the operator's network. The drawback of this type of independent architecture, as described in FIG. 2 and FIG. 3, is that it does not facilitate any integration between the functions of IMS and the functions of the Mobility Manager in order that enhanced services be provided. To exemplify, in FIG. 2 and FIG. 3, there is no interface between the HSS and the Subscriber Context Register (SCR) and there is no interface between the S-CSCF and the Mobility Manager. This imposes the following implications:

The operator, via the S-CSCF, does not have any central control on the Mobility Manager service as there is no interface provided to perform this control. The S-CSCF is being bypassed for the use of the IPMM service, i.e. the IPMM service is being provided independently of the IP Multimedia Subsystem. The drawback of this type of architecture is that in order to provide an IPMM service to IMS subscribers in this way, two systems have to be managed in a independent manner.

A local IPMM database, containing information related to the subscribers of the IPMM service, is not synchronised with the HSS, which is a central operator database. As a result the data pertaining to user subscription and service related information is split into two databases, which are the HSS which contains the global User Profile and the local IPMM database which contains user data related to the IPMM service. A drawback of this type of architecture is that the operator has to manage two databases instead of one.

There is no standard access architecture provided to enable application servers to connect to the Mobility Manager in order that they can SUBSCRIBE to receive mobility information pertaining to an IPMM subscriber. Instead it is required that each application servers uses a proprietary connection to the Mobility Manager in order that this action can be performed. The drawback of this approach is that there is no ubiquitous method to unify through one access interface, the way in which ALL application servers can have a standard interface and connection to the mobility server through the IP Multimedia Subsystem.

There is currently no security mechanisms implemented at the Mobility Manager that allows the mobility information for a particular subscriber to be shared with 3rd party applications, hosted in a "non-trusted" IP network.

Integrating the IP Mobility Manager component as a standalone function within the operator's network will not provide an optimised framework for providing enhanced services. This will also add complexity to the network as, for instance, user related information is split between two databases, and there is no central provisioning of an overall combination of IPMM and IMS functions. One solution would be to add new interfaces between the Mobility Manager and the S-CSCF and between the Mobility Manager and the HSS. This could allow synchronisation of the database and more control from the S-CSCF on the service. But on the other side, adding proprietary interfaces at the HSS and the S-CSCF, will lead to architecture changes, network component upgrade and interoperability issues between different IMS vendors.

IMS ENHANCED WITH A MOBILITY SERVER

Embodiments of the present invention can incorporate a mobility manager as a function to provide an IP mobility management service within an IMS network. Requirements for a proprietary solution are removed by re-using as far as possible established interfaces and protocols in order to provide service continuity while roaming across heterogeneous access network technologies. This is achieved by, amongst other things, proposing the IP Mobility Manager to serve as a Mobility Server within the IMS architecture, by enhancing its capabilities to use standardized interfaces.

Figure 4:
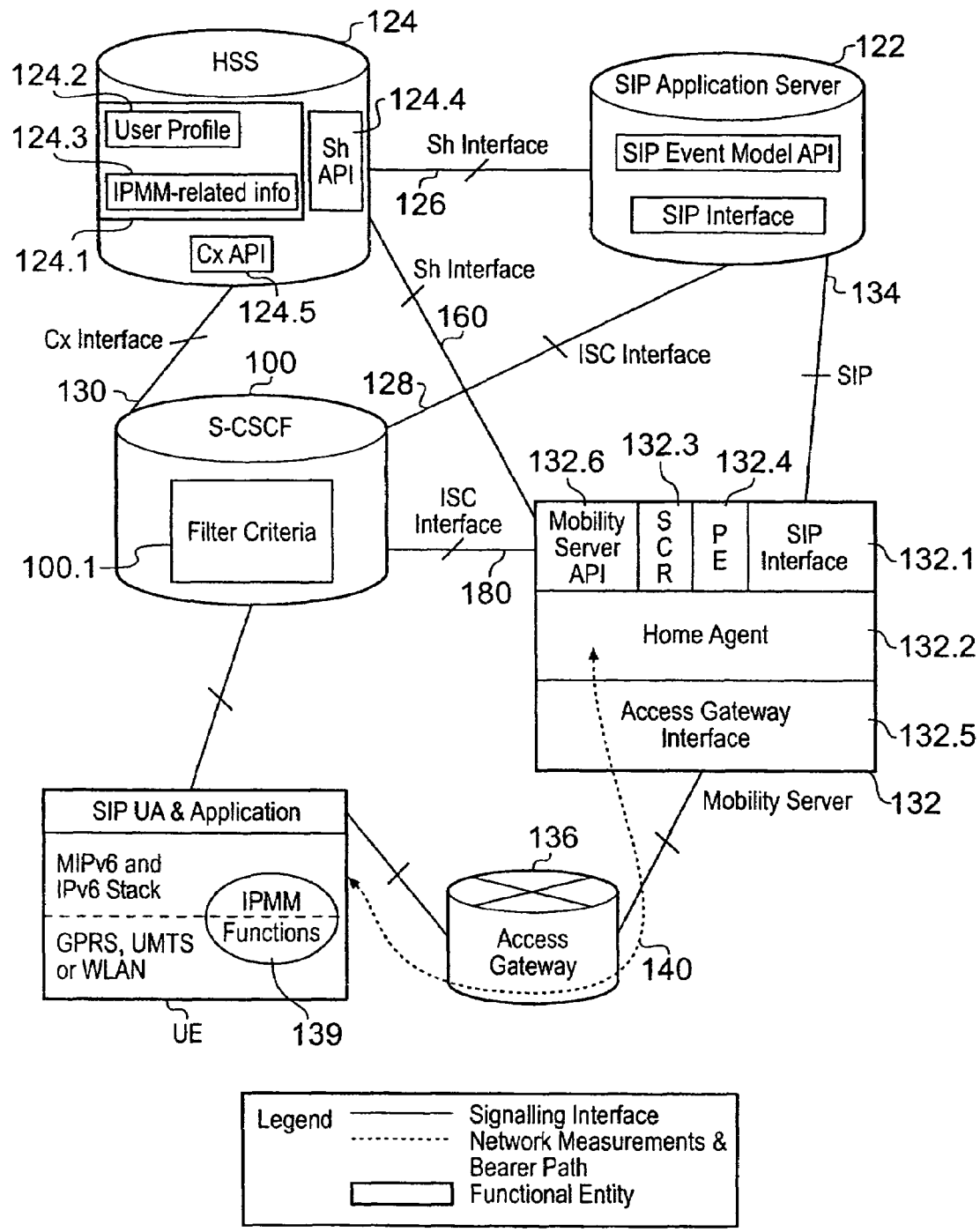
FIG. 4 is a schematic block diagram of parts of a system for integrating a mobility server with an IMS according to an embodiment of the present invention.

An example embodiment of the present invention is illustrated in FIG. 4. As shown in FIG. 4 a mobility server 132 is provided with an interface to the HSS 124 and to the S-CSCF 100. Parts shown in FIG. 4 correspond to the parts shown in FIG. 3 and have been assigned related reference numerals. However, FIG. 4 includes a mobility server 132 to provide mobility management information for controlling a multimedia session in accordance with current communication conditions experienced by a user equipment in a way which utilises the IMS architecture. As before, the mobility server 132 is arranged to receive Access Network Evaluation (ANE) reports from an IPMM function 139 operating as part of the user equipment UE via an IP communications layer 140. The mobility server 132 is provided with an interface to the HSS 124, which is an Sh interface 160. The mobility server 132 is also provided with an ISC interface 180 to the S-CSCF. Otherwise, elements in the IMS system shown in FIG. 4 correspond to the elements shown in FIG. 3 since one of the advantages provided by the system shown in FIG. 4 is that it re-uses standardised network elements and interfaces between those elements, to the effect that the system shown in FIG. 4 is compatible with existing IMS network architectures.

In some embodiments an interface is provided between the mobility server 132 and the application server 122, which can be used to communicate information directly between the mobility server 132 and the application server 122. The interface can convey the information in accordance with, for example, the SIP, XML or HTTP standards.

The proposed architecture shown in FIG. 4 integrates the mobility server 132 into an IMS whilst imposing a minimum of additional interface or associated development to the already existing IMS components. Therefore integration is substantially independent of the hardware and will work with any vendor's equipment. Deploying the IP Mobility Management service as an enabler to the IMS will not require more work and investment than for currently deploying a new service within the IMS.

By integrating IPMM within the IMS it will be possible to re-use some IMS mechanisms such as:

- The service provisioning procedure; allowing a facility for a service to be provisioned from a common data base which is the HSS and a mechanism for the mobility server to down-load data from the HSS to a Subscriber Context Register (SCR) using the Sh interface for applications within the mobility manager.
- The Third Party (de-)Registration; allowing the S-CSCF to control the mobility server and to notify the mobility server that it has to start or stop collecting the mobility information for the user that just registered in the IMS.
- The billing methods; allowing charging not only based on the data traffic that is transferred, but also on the event or on the session.
- Application server access; allowing application servers a standard access architecture which goes through the S-CSCF to the mobility server. This allows for any application server to have one unified method of getting access to information to and from the Mobility Server.
- The security mechanisms; defined in case a service is hosted in a "non-trusted" network, allowing the mobility server to provide mobility information to a 3rd party application in a secure way.

IMS provides an enhanced SIP based service architecture, providing a framework for enhanced applications development combining real-time and data services. IMS also provides enhanced billing and QoS control, which IETF services do not. Embodiments of the present invention can bring together benefits of both IPMM in providing network controlled mobility management and IMS in providing an advanced and flexible session control architecture. This will allow an operator to offer enhanced high quality services providing smooth network controlled hand-over (Seamless Mobility) and application adaptation to network type, enhances applications and services within the IMS. This will provide the operator with a more optimized, integrated and easily managed framework when compared to providing just a simple IPMM service to its customers.

BRIEF DESCRIPTION OF IMS NETWORK ELEMENTS

For completeness a brief description of the elements of an IMS network according to an embodiment of the invention will be described.

The S-CSCF (Serving CSCF)

The Serving CSCF is one of the three Call State Control Function (CSCF) described within the 3GPP Specifications [1], [4]. According to [4], the Serving-CSCF (S-CSCF) performs session control services for a user equipment UE. It also maintains "a session state as needed by the network operator for support of the services".

Within the same operator's network, different S-CSCFs may have different functionalities. In this scenario, we assume that the selected S-CSCF supports all the required functionalities. During a session, the S-CSCF may behave as a registrar [9], as a Proxy Server [9], as a User Agent [9] and may also interact with Service Platform for the support of services.

The HSS (Home Subscriber Server)

The Home Subscriber represents the master database of an operator's network. Among the stored information, the HSS contains information related to the subscribers and information related to the network itself. The HSS is accessed by different network elements when performing different procedures (service provisioning, registration, call set-up, call re-negotiation, call release . . . ) and for different purposes (update, query . . . ). Within the IMS architecture, the DIAMETER protocol [7],[8] has been chosen for accessing the HSS, using the Cx, Dx [6] or Sh interface [3].

The SIP Application Server

The SIP application server has to be seen as a service platform, that is to say a service deployment and execution environment. This is where services (or application) will be executed, whereas the call control will be performed at the S-CSCF layer. The SIP application server considered in this document has to meet some of the 3GPP requirements, such as supporting the ISC interface, which is still being standardised and should be very close to a SIP interface.

The Access Gateway

The access gateway is a logical entity that represents one Access Network. All user data transits through the access gateway, and assumes the responsibility of allocating a Care-of-Address (CoA) to the end user roaming in a given access network.

The Mobility Server:

The mobility server is based on an IP router that is enhanced with new functions. The mobility server includes the Policy Enforcer (PE) and the Subscriber Context Register (SCR) functional entities, as well as the mobility manager itself. The mobility server also implements the Home Agent. It is enhanced with the Sb and the ISC interfaces. The SCR is a database for providing mobility-related information downloaded from the HSS, and Access Network Evaluation reports received from, for example, the user equipment. The PE implements a policy for executing hand-over from one network to another based on established conditions. The conditions may implement a network policy and so may be defined by the network operator, or may be in part specified in accordance with user preference.

The above-described embodiments of the present invention have been illustrated for an example of videoconference multi-media communications session. However, it will be appreciated that this is but one example application. In other examples, there may be no substantial communication of data between a user equipment and the application server, but an application program may subscribe to mobility management information to serve an application dedicated to the user equipment.

BRIEF DESCRIPTION OF IMS INTERFACES AT THE MOBILITY SERVER

The Sh Interface (Between the Mobility Server and the HSS):

The Sh interface is an intra-operator interface and is based on the DIAMETER protocol (DIAMETER is also used on the Cx interface between the HSS and the I/S-CSCF). Data handling procedures (download of data from the HSS to the Application Server (AS), update of data in the HSS) and subscription/notification procedures (The HSS can notify an AS of changes in data for which the AS previously had subscribed) can be performed over the Sh interface. More information on the Sb interface can be found in [2] and [3].

According to the example embodiment described above, the Sb interface is used by the mobility server to communicate with the HSS. This interface will be used to support a mechanism for transferring of user related data stored in the HSS or to "push" user data to the HSS.

The ISC Interface (Between the Mobility Server and the Serving CSCF)

The ISC interface is briefly defined in [4] 4.2.4 and the relationship between the ISC interface and the S-CSCF are described in [1] 6.2.

Functionally, the ISC interface is between the S-CSCF and the service platform(s). The application servers that run services have been decoupled from other network equipment, and the interface (the 'ISC interface'), which is still being standardised, will allow application servers from multiple vendors to be used on top of the IMS subsystem. This standardising of the application server interface provides a possibility that third party application service providers may provide additional services, allowing operators to offer services that they would otherwise not be possible.

Technically, the ISC interface is a SIP interface. It is advised to keep it as close to the SIP standard [9] as possible and to avoid any SIP extension that is already used on the different interfaces with the S-CSCF. As such, it is more likely that IETF application servers will inter-work with the IMS network. It is assumed that the application server will be arranged to support a third party registration, has to properly handle a Dialog Identifier (which should not be an issue because it will be included within a Route header) and finally support a Subscribe/Notify event model.

The Mobility Aware Interface (Between the Mobility Server and an Application)

The Mobility aware interface allows the communication between the mobility server and an application program hosted on a SIP application server. This interface is using a proprietary XML based protocol that will be encapsulated within SIP messages (SUBSCRIBE/NOTIFY SIP Event Model). The mobility aware interface allows the application to register its interest in the mobility management of a particular subscriber. It also allows the mobility server to notify the application program that a hand-over between two different radio access networks is about to occur.

The Access Gateway Interface (Between the Access Gateway and the Mobility Server)

The access gateway interface collates radio network measurements from various underlying access technologies in order to make handover decisions.

Other Interfaces within the IMS Network

The Cx Interface (Between the S-CSCF and the HSS)

The Cx interface is the interface between the Call State Control Functions (Interrogating and Serving—The Proxy CSCF does not have any interface with the HSS). The Cx interface is described in [5] and [6].

The Gm Interface (Between the SIP User Agent and the S-CSCF)

The S-CSCF supports the signalling interactions with the UE via the Gm interface. Depending on the Radio Access Network there will be a different number of network elements between the UE and the S-CSCF. A Proxy Call State Control Function (P-CSCF) can represent an entry point within the IMS network; therefore there will always be a P-CSCF between the UE and the S-CSCF. Some network elements have been voluntarily removed for readability and simplicity purposes.

EXAMPLE IMPLEMENTATION

Figure 5:
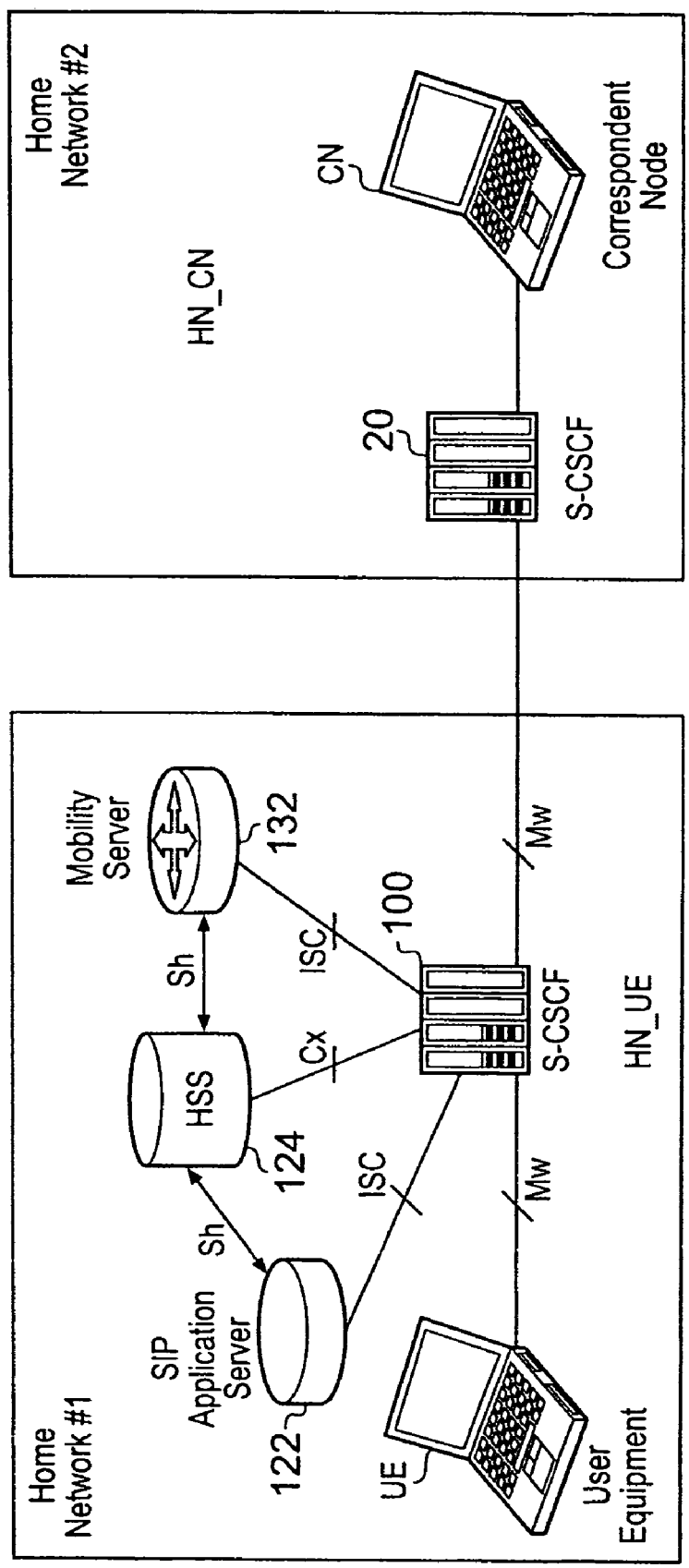
FIG. 5 is a schematic block diagram of a system according to an example embodiment corresponding to the simplified system shown in FIG. 2.

In accordance with an embodiment of the invention the adapted IMS architecture which now includes a mobility server 132 is shown in FIG. 5 which corresponds otherwise to the block diagram of the communication between the user equipment UE and the correspondent node CN in FIG. 2. FIG. 5 therefore illustrates an arrangement of the IMS architecture for providing a multimedia communication session which has been adapted to include the mobility server 132 in accordance with an embodiment of the present invention. Therefore, remaining parts of the adapted IMS system, function in a corresponding way to that illustrated in FIG. 2. It will be appreciated that those elements within the IMS subsystem forming part of the first home network for the user equipment UE will operate in a corresponding way and therefore further explanation is not required.

As illustrated in FIG. 4 the mobility server 132 includes an application programmer's interface 132.6 to provide a facility for a mobility manager to notify application programs being executed by the SIP application server 122 of mobility dependent parameters which change as a function of mobility and/or time.

Figure 6:
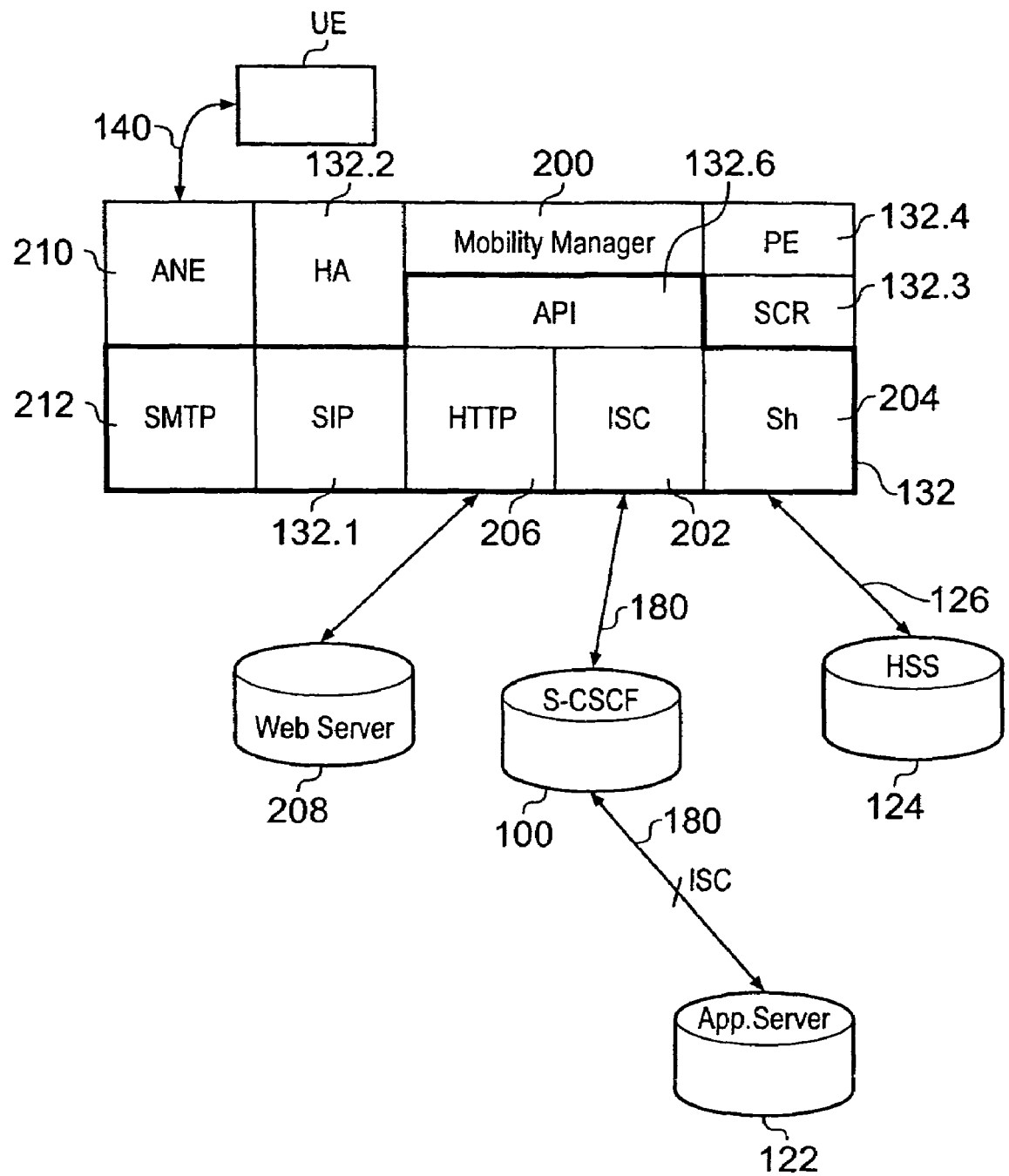
FIG. 6 is a schematic block diagram providing an example of a mobility server according to an embodiment of the present invention.

FIG. 6 provides an alternative representation to the IMS architecture illustrated in FIG. 5 which includes more details of the mobility server 132. As shown in FIG. 6 the mobility server 132 includes a mobility manager 200 as well as the parts, which are also illustrated in FIG. 4. The mobility server includes the home agent 132.2 as well as PE 132.4 and SCR 132.3. The SIP interface 132.1 is provided for communicating with the SIP messages. As shown the mobility server 132 includes an application programmers interface 132.6 (part indicated with a bolder outline) for providing access to mobility dependent information via various interfaces including the IMS Service Control (ISC) interface 180 for interfacing with the S-CSCF 100, an Sh interface controller 204 for interfacing with the HSS 124 via the interface 126 and an HTTP interface controller 206 for interfacing with a web server 208. Also shown in FIG. 6 the mobility server 132 includes an Access Network Evaluation (ANE) interface controller 210 for receiving IP packets from the IPMM function 139 within the user equipment UE, which indicate a current state of communications which are available to the user equipment UE. The mobility server 132 also includes an SMTP interface controller 212 for exchanging e-mail with an e-mail server which may also depend upon communications conditions which change in accordance with mobility.

GENERAL OPERATION OF MOBILITY SERVER WITHIN THE IMS NETWORK

Figure 7:
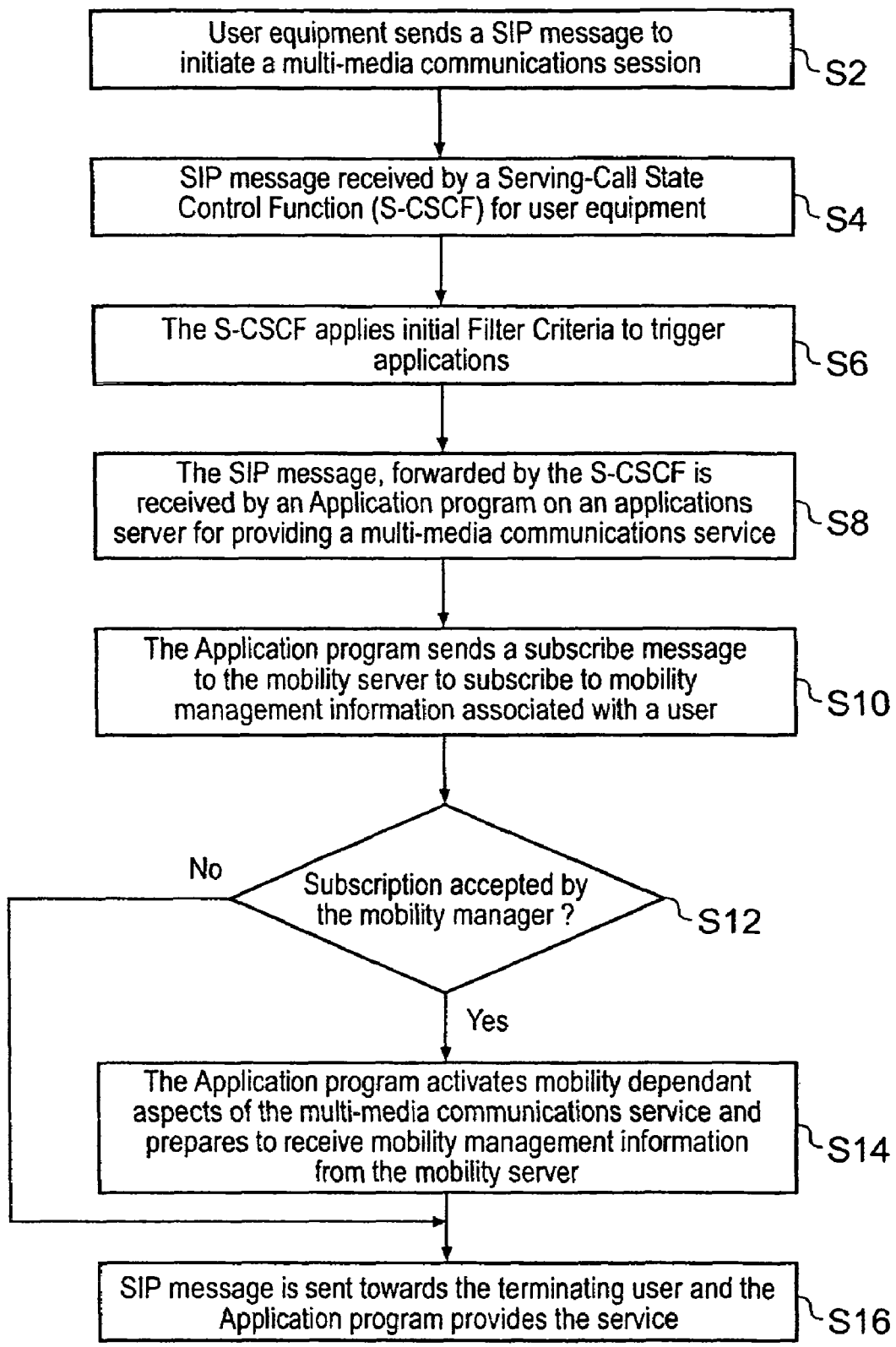
FIG. 7 is an example flow diagram illustrating the operation of a user equipment deploying a multi-media communications service provided by an application program and the application program subscribing to a mobility server for mobility management information.
Figure 8:
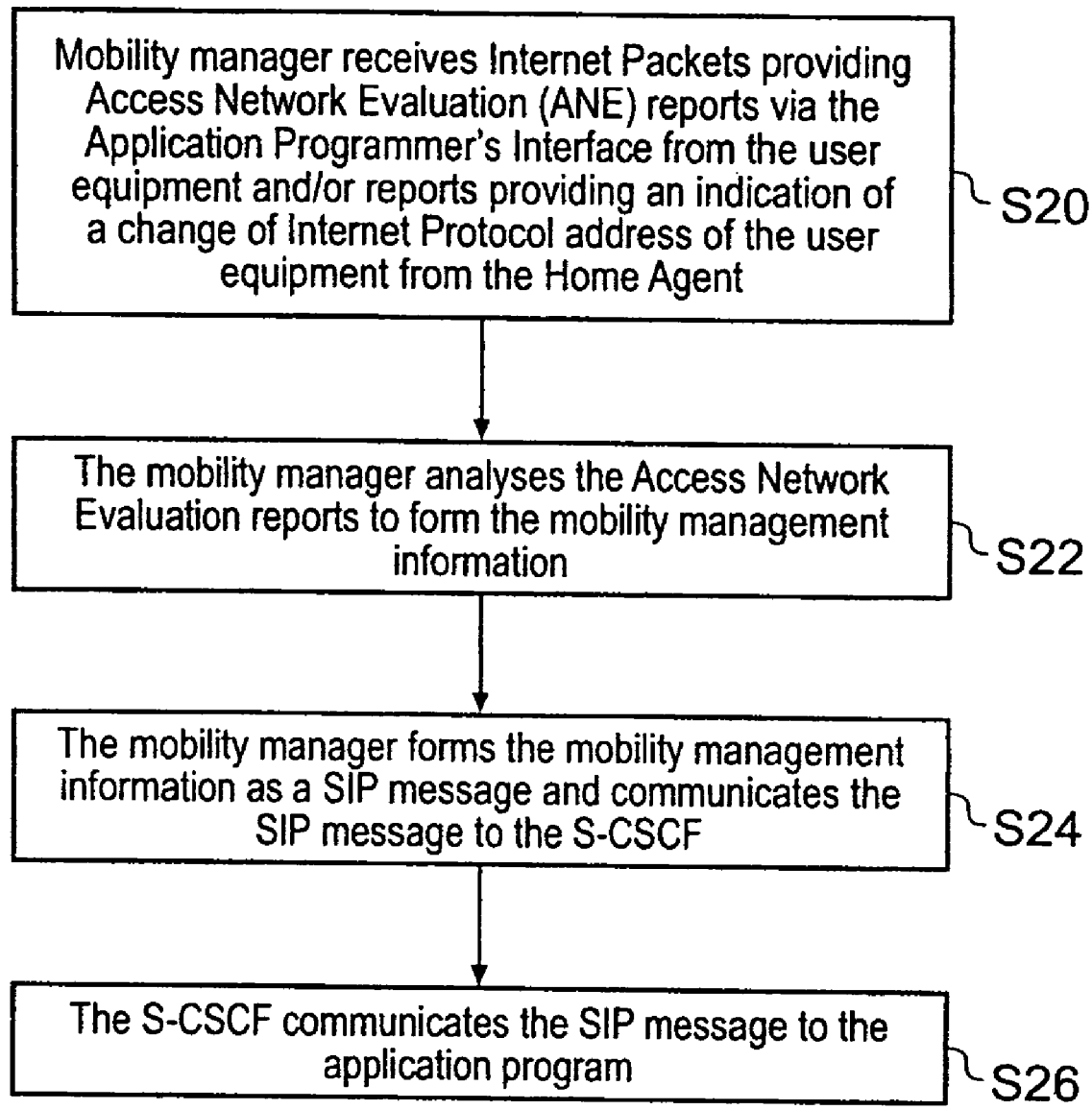
FIG. 8 is an example flow diagram illustrating the operation of the mobility server providing mobility management information to the application program.
Figure 9:
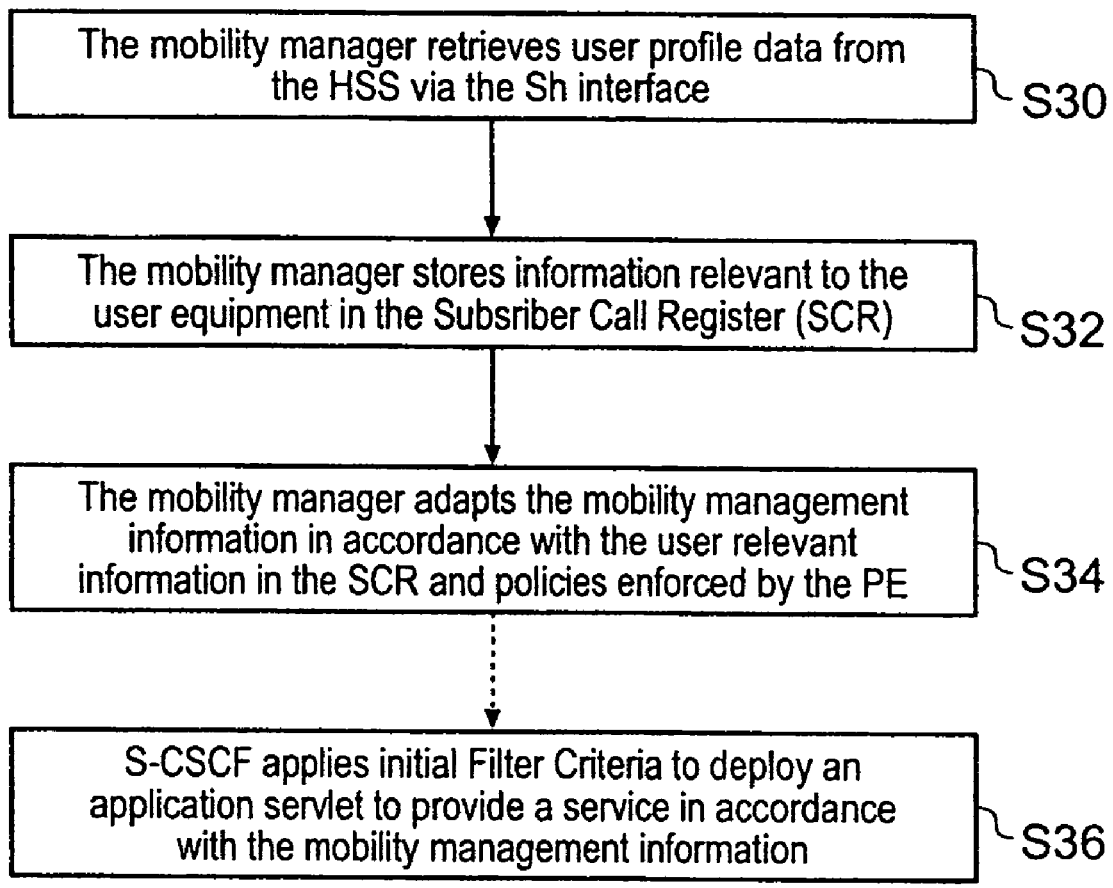
FIG. 9 is flow diagram illustrating optional process steps taken by the mobility management and an S-CSCF in the flow diagrams of FIGS. 7 and 8.

A process of establishing and providing a multi-media service to a mobile user equipment using the mobility server integrated as part of the IMS network according to the example embodiment described above can now be illustrated by way of flow diagrams provided in FIGS. 7, 8 and 9. The flow diagram illustrated in FIG. 7 relates to a process through which a mobile user equipment initiates a multi-media service using a SIP message exchange with a correspondent node. An example of such a multi-media service is a video conference call, which requires both video and audio information to be communicated between the user equipment and a correspondent node. The video conference service is provided by an application program hosted on the application server 122. However, since the user equipment is mobile, the application program providing the video conference service will need to subscribe to the mobility server 132 for mobility management information. The mobility management information may be used for example to adapt the type of service provided to the mobile user equipment in accordance with the type of wireless access interface, which is available to the user equipment. For example, if the mobile user equipment is at a location where communication can be made via a Wireless Local Area Network (WLAN) then a relatively high bandwidth may be available. As such the application program can provide a video and audio services to the mobile user equipment. If however, the mobile user equipment is at a location where communication via a WLAN is not available, but communication is available via a GPRS access interface, then the application program can only provide an audio service and so will adapt the type of service provided to the mobile user equipment accordingly. Once the WLAN is again available then the mobility manager will report mobility management information indicating that a change in the state of conditions for communicating has occurred, in accordance with those conditions provided by the WLAN. Accordingly, the application program will adapt the service again to provide a video and audio service in accordance with an increased communications bandwidth provided by the WLAN.

The operation of the user equipment in combination with the application program to establish a multi-media communications session, which triggers the application program to subscribe to the mobility manager is provided in FIG. 7. The process provided in FIG. 7 is summarised as follows:

S2: A user equipment UE sends a SIP message to a correspondent node CN inviting the correspondent node to take part in a multi-media communications session. As mentioned above, an example of a multi-media communications session is a multi-media conference provided between the user equipment UE and the correspondent node CN.

S4: The SIP message is received by the Serving-Call State Control Function (S-CSCF) within an IMS network, which is serving the user equipment UE.

S6: Before being routed to the correspondent node, the S-CSCF applies initial filter criteria in order to determine whether the request should be forwarded to application programs for providing services for which a user has subscribed.

S8: Applying the initial filter criteria, the S-CSCF forwards the SIP message to an application program on an application server 122 for providing the multi-media communications service.

S10: The application program sends a subscribe message to the mobility server to subscribe for mobility management information associated with a particular user served by the S-CSCF which forwarded the SIP message to the application program.

S12: Although the application program applies for mobility management information from the mobility server for a particular user, the subscription may not be accepted. The subscription may not be accepted if the user is not mobile and therefore will not need mobility management information, or because the user has not subscribed (signed-up) for a mobile service. Therefore the application program is informed by the mobility server whether or not the subscription has been accepted by mobility manager for the user.

S14: If subscription is accepted by the mobility manager, then the application program begins monitoring for mobility management information from the mobility server for the user or users concerned, and activates a mobility dependent aspect of the service to be provided.

Once the application program has subscribed to the mobility server, the mobility server may provide the mobility management information to the application program as illustrated by the flow diagram in FIG. 8.

S16: Once the application program for providing the multi-media communications session has been deployed, the application program sends a SIP message, to the S-CSCF. The S-CSCF then sends a SIP message towards the correspondent node CN. An S-CSCF within a network serving the correspondent node CN may deploy associated application programs.

As mentioned above, once the application program for providing the multi-media communications session has subscribed to the mobility server, the mobility server monitors mobile dependent parameters of the user equipment and reports these to the application server. The operation of the mobility server in combination with the S-CSCF is illustrated in FIG. 8. FIG. 8 is summarised as follows:

S20: After the application program has subscribed to the mobility server for mobility management information, a mobility manager, within the mobility server is arranged to receive mobility dependent evaluation reports from the user equipment. The mobility dependent evaluation reports are received as IP packets, and may include Access Network Evaluation (ANE) reports providing information on a current type of access network (WLAN, UMTS, GRPS etc) which is available for communications. Alternatively, where an access network is capable of providing a variable communications bandwidth depending on a currently experienced state of communication condition using the same access network interface, then the currently experienced communications conditions are provided by the ANE reports. In addition, should the mobile user equipment change affiliation from one Internet Protocol (IP) network to another, then a change of IP address will occur. As a result the Home Agent 132.2 forming part of the mobility manager 132, will provide an indication that the IP address of the user equipment has changed. The mobility manager 200 will apply the change of address to a pre-stored list of IP addresses, or parts of IP addresses to generate an indication of a geographical location of the user equipment. The mobility manager stores the ANE reports as well as the change of IP address in a data base associated with the UE.

S22: The mobility manager analyses the ANE reports and the relative change of IP address to form mobility management information for communication to the application program which has subscribed to the mobility server. The mobility manager may inform the application program when a change in the conditions for communicating has occurred or a change of the IP address has occurred. Alternatively, the mobility manager may inform the application program periodically of a current state of the conditions for communicating, or a current IP address.

S24: The mobility manager forms the mobility management information into a SIP notify message for communication to the application program. The mobility manager communicates the SIP notify message to the S-CSCF.

S26: The S-CSCF communicates the SIP message to the application program, thereby providing the mobility information.

The flow diagram in FIG. 8 provides an illustration of the operation of the mobility server in combination with the S-CSCF to provide mobility management information. However, in some embodiments further process steps may be introduced to provided added value to the user through an established standardised architecture of the IMS network. An example of such further steps is illustrated in FIG. 9. The process illustrated in FIG. 9 is summarised as follows:

S30: Following step S14, the mobility manager is arranged to retrieve mobility-related information from the HSS via the Sh interface.

S32: From the mobility related information, the mobility manager extracts information which is relevant to mobility and stores this information in the Subscriber Call Register (SCR). Such relevant information may include an agreed charging tariff for providing mobile multi-media services, a type of device and therefore services which the user equipment can support and whether the mobile user equipment is currently communicating or whether the mobility manager is to provide mobility information pending activation of a communications session.

S34: The mobility manager adapts the mobility management information in accordance with the user relevant information in the SCR. The services which are supportable on the user equipment may be used to tailor the mobility management information which is provided to the application program.

S36: Optionally, when the S-CSCF receives the SIP message providing the mobility management information, the S-CSCF may activate one or more other application programs. These application programs may provide added value services to the subscriber or the network operator. Such services may include billing, data management and security control.

Figure 10:
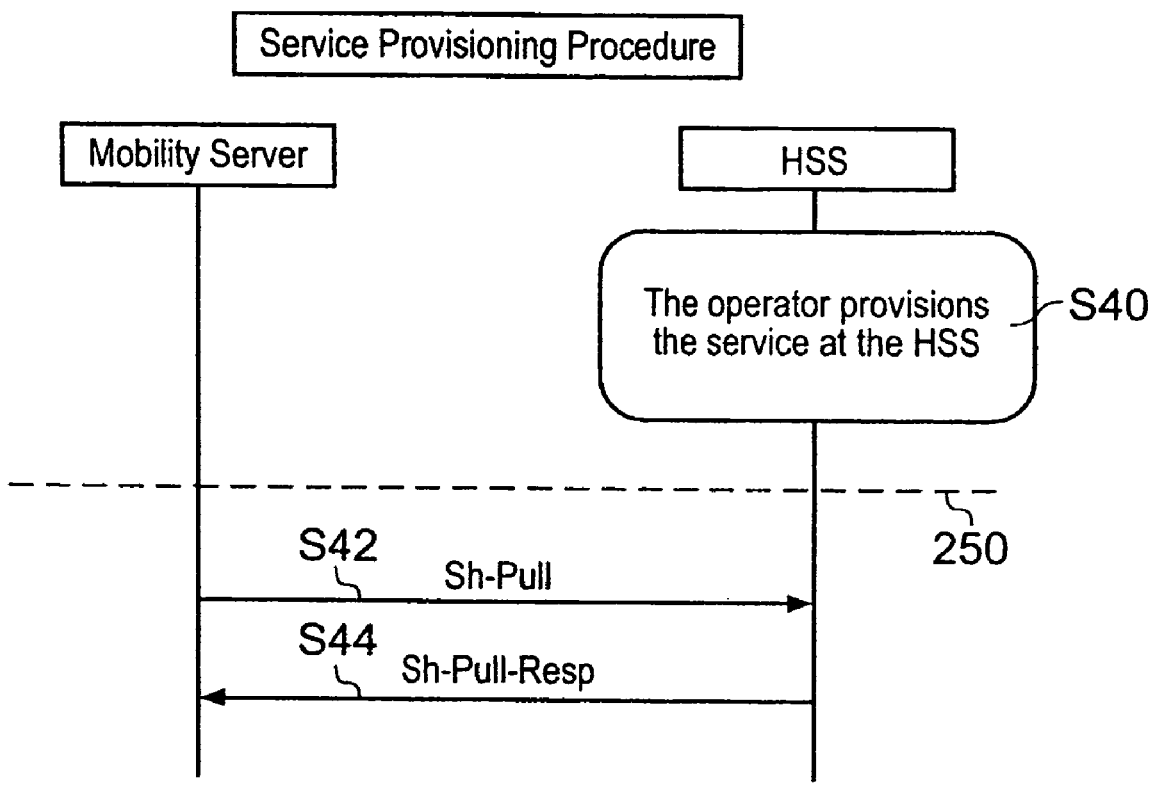
FIG. 10 is an example flow diagram illustrating a process for pulling information from a Home Subscriber Server by the Mobility Server.

A process through which a user subscribes for an IPMM service to an operator, in response to which the mobility manager is provision by the operator is illustrated by a flow diagram shown in FIG. 10. During service provision, user profile data is loaded into the HSS database (non-transparent part) together with mobility-related information (transparent part). When the user requests a service requiring mobility related information, then the mobility-related information is download from the HSS by the mobility manager and stored in the SCR for use by the mobility manager. The flow diagram provided in FIG. 10 is summarised as follow:

S40: A user subscribes to an IPMM service, which then enables services to be adapted in accordance with a user's mobility. The operator provisions for the IPMM service to be deployed, by loading user profile data (initial filter criteria etc) and mobility-related information into the HSS database. As represented by a dashed line 250, once the HSS database has been loaded, no further parts of the provisioning procedure take place, until the mobility manager needs the mobility related information for a particular user in order to provision or to update its SCR.

S42: Once a user has been registered by the IMS network, the mobility server can interrogate the HSS for mobility-related information by communicating via the Sh interface with the Sh API on the HSS. It can be envisaged that triggering an update of the information for a user in the SCR from that in the HSS can be done in several ways, registration of the user to the IMS network being one example. The HSS is interrogated for mobility-related information associated with the user, because the mobility server knows that the user has subscribed to an IPMM service.

S44: Following the interrogation the mobility server pulls the mobility-related information from the HSS, via the Sh interface and stores the information in the SCR ready for use in providing a mobility dependent management information.

Various modifications may be made to the embodiments of the invention herein before described without departing from the scope of the present invention. It will be appreciated that the session initiation protocol is one example of a session initiation protocol which can be used to establish an internet protocol communications session and that the present invention finds application with other such protocols.

Various further aspects and features of the present invention are defined in the appended claims.

REFERENCES

[1]: 3GPP TS 23.218: IP Multimedia Session Handling—IP Multimedia Call Model—Stage 2 (Release 5)
[2]: 3GPP TS 29328: IP Multimedia (IM) Subsystem Sh interface; Signalling flows and message contents (Release 5)
[3]: 3GPP TS 29329: IP Multimedia (IM) Subsystem—Sh Interface based on the Diameter protocol—Protocol details (Release 5)
[4] TS 23.228: IP Multimedia Subsystem (IMS); Stage 2 (Release 5)
[5] TS 29.228: IP Multimedia (IM) Subsystem Cx and Dx interfaces—Signalling flows and message contents (Release 5)
[6] TS 29.229: Cx and Dx interfaces based on the Diameter protocol—Protocol details (Release 5)
[7] RFC 3588—IETF Request For Comments—Diameter base protocol—September 2003
[8] RFC 3588—IETF Request For Comments—Diameter Command Codes for Third Generation Partnership Project (3GPP) Release 5—September 2003
[9] RFC 3261—IETF Request For Comments—The Session Initiation Protocol—June 2002

The invention claimed is:

1. A mobility server for providing mobility management information to an application program providing a service to a user equipment as part of an Internet Protocol Multi-media Sub-system (IMS), the mobility server comprising:
a mobility manager operable to receive mobility dependent evaluation reports providing at least one of an indication of current conditions for communicating with the user equipment and an indication of a relative location of the user equipment, and to form the mobility management information based on the evaluation reports, and
an application programmer's interface operable to communicate call control signalling data between the mobility manager and a session protocol server (S-CSCF) forming part of the IMS, wherein the mobility manager is operable to notify the application program of the mobility management information in response to a subscription for the mobility management information from the application program, the subscription for the mobility management information being provided via the session protocol server (S-CSCF) using the call control signalling data,
wherein the application programmer's interface is arranged to provide access to a subscriber information database (HSS) of the IMS, the subscriber information database providing user profile data for the user equipment, the application program being arranged to subscribe to the mobility manager for the mobility management information, if the user profile data indicates that the user equipment is mobile.

2. The mobility server as claimed in claim 1, wherein the mobility manager is operable to provide the mobility management information to the application server via the call control signalling data communicated via the session protocol server (S-CSCF).

3. The mobility server as claimed in claim 1, wherein the application program is operable in response to messages received from the session protocol server via the call control signalling data to provide the service in accordance with the mobility management information.

4. The mobility server as claimed in claim 1, comprising a Session Initiation Protocol (SIP) interface, wherein the application programmer's interface is operable to communicate the call control signalling data via the SIP interface, the call control signalling data being SIP data.

5. The mobility server as claimed in claim 1, wherein the mobility server includes a subscriber context register for storing information relating to the user profile data relevant for the mobile user equipment, the user information being used by the mobility manager to adapt the mobility management information for the application program.

6. The mobility server as claimed in claim 1, comprising an interface with an application server for hosting the application program, the application program providing the service to the user equipment in accordance with the mobility management information provided by the mobility server, the application programmer's interface including a facility for communicating with the application server.

7. A mobility server for providing mobility management information to an application program providing a service to a user equipment as part of an Internet Protocol Multi-media Sub-system (IMS), the mobility server comprising:
a mobility manager operable to receive mobility dependent evaluation reports providing at least one of an indication of current conditions for communicating with the user equipment and an indication of a relative location of the user equipment, and to form the mobility management information based on the evaluation reports, and
an application programmer's interface operable to communicate call control signalling data between the mobility manager and a session protocol server (S-CSCF) forming part of the IMS, wherein the mobility manager is operable to notify the application pro gram of the mobility management information in response to a subscription for the mobility management information from the application program, the subscription for the mobility management information being provided via the session protocol server (S-CSCF) using the call control signalling data,
wherein the applications programmer's interface is arranged to receive internet packets, the internet packets including the evaluation reports, and to provide the evaluation reports to the mobility manager.

8. The mobility server as claimed in claim 7, wherein the mobility server includes a home agent for receiving the internet protocol packets from the user equipment, the mobility manager being operable to determine the relative location of the user equipment from a change of internet protocol address for the user equipment provided to the home agent, the relative location forming part of the mobility information communicated to the application program.

9. The mobility server as claimed in claim 7, wherein the mobility server is responsive to the internet packets providing access network evaluation reports to determine a current state of conditions for communicating with the user equipment, the mobility server being operable to include an indication of the communications conditions with the mobility management information.

10. The mobility server as claimed in claim 7, wherein the mobility manager is operable to provide the mobility management information to the application server via the call control signalling data communicated via the session protocol server (S-CSCF).

11. The mobility server as claimed in claim 7, wherein the application program is operable in response to messages received from the session protocol server via the call control signalling data to provide the service in accordance with the mobility management information.

12. The mobility server as claimed in claim 7, comprising a Session Initiation Protocol (SIP) interface, wherein the application programmer's interface is operable to communicate the call control signalling data via the SIP interface, the call control signalling data being SIP data.

13. The mobility server as claimed in claim 7, wherein the application programmer's interface is arranged to provide access to a subscriber information database (HSS) of the IMS, the subscriber information database providing user profile data for the user equipment, the application program being arranged to subscribe to the mobility manager for the mobility management information, if the user profile data indicates that the user equipment is mobile.

14. The mobility server as claimed in claim 7, wherein the mobility server includes a subscriber context register for storing information relating to the user profile data relevant for the mobile user equipment, the user information being used by the mobility manager to adapt the mobility management information for the application program.

15. The mobility server as claimed in claim 7, comprising an interface with an application server for hosting the application program, the application program providing the service to the user equipment in accordance with the mobility management information provided by the mobility server, the application programmer's interface including a facility for communicating with the application server.

16. A multi-media communications system for providing a service to user equipment in accordance with mobility management information, the service being provided by an application program, the system comprising:
  a session protocol server (S-CSCF) operable to control the state of a communications session for at least one user equipment in accordance with user profile data,
  a subscriber information database (HSS) for providing the user profile data to the session protocol server (S-CSCF),
  a mobility server comprising a mobility manager operable to receive mobility dependent evaluation reports providing at least one of an indication of a current state of conditions for communicating with the user equipment and an indication of a relative location of the user equipment, and to form the mobility management information based on the evaluation reports, and
  an application programmer's interface operable to communicate call control signalling data between the mobility manager and the session protocol server (S-CSCF), wherein the mobility manager is operable to notify the application program providing the service to the user equipment of the mobility management information in response to a subscription for the information from the application program, the subscription being provided via the session protocol server (S-CSCF) using the call control signalling data,
  wherein the applications programmer's interface is operable to provide access to the subscriber information database, to receive internet packets from the user equipment providing data representing the evaluation reports and to provide the evaluation reports to the mobility manager.

17. A method for providing mobility management information to an application program providing a service to a user equipment in an Internet Protocol Multi-media Sub-system (IMS), the method comprising:
  receiving mobility dependent evaluation reports at a mobility server, the evaluation reports providing at least one of an indication of a current state of conditions for communicating with the user equipment or an indication of a relative geographical location of the user equipment,
  forming the mobility management information based on the evaluation reports, and
  notifying the application program providing the service to the user equipment of the mobility management information in response to a subscription for the information from the application program, wherein the subscription for the mobility information is provided from the application program to the mobility server by
  communicating call control signalling data between the mobility manager and the application program via a session protocol server (S-CSCF) forming part of the Internet Protocol Multi-media Sub-system,
  wherein the mobility server includes a home agent, and the indication of the relative location of the mobile user equipment is provided by evaluations reports based on an indication of a change of an internet protocol address of the user equipment notified to the home agent, the forming the mobility management information comprising
  determining the relative geographical location of the user equipment from the change of internet protocol address for the user equipment provided to the home agent, the geographical location forming part of the mobility information communicated to the application program.

18. The method as claimed in claim 17, wherein the notifying the application program of the mobility management information, comprises
  communicating the mobility management information to the application server using the call control signalling data, the call control signalling data being communicated via the session protocol server (S-CSCF).

19. A method as claimed in claim 18, the method comprising
  providing access network evaluation reports indicating the current state of conditions for communicating with the user equipment, the mobility server being operable to include an indication of the communications conditions with the mobility management information.

20. The method claimed in claim 17, wherein the call control signalling data include Session Initiation Protocol (SIP) messages.

* * * * *